US00RE46106E

(19) United States
(12) Reissued Patent
Seong et al.

(10) Patent Number: US RE46,106 E
(45) Date of Reissued Patent: Aug. 16, 2016

(54) SCROLL COMPRESSOR

(71) Applicant: LG Electronics Inc., Seoul (KR)

(72) Inventors: Sanghun Seong, Seoul (KR); Cheolhwan Kim, Seoul (KR); Byeongchul Lee, Seoul (KR); Samchul Ha, Seoul (KR)

(73) Assignee: LG Electronics Inc., Seoul (KR)

(21) Appl. No.: 14/539,834

(22) Filed: Nov. 12, 2014

Related U.S. Patent Documents

Reissue of:
(64) Patent No.: 8,308,460
Issued: Nov. 13, 2012
Appl. No.: 13/398,649
Filed: Feb. 16, 2012

(30) Foreign Application Priority Data

Mar. 9, 2011 (KR) ..... 10-2011-0021108
May 17, 2011 (KR) ..... 10-2011-0046492

(51) Int. Cl.
*F03C 2/00* (2006.01)
*F03C 4/00* (2006.01)
*F04C 2/00* (2006.01)
*F04C 18/02* (2006.01)

(52) U.S. Cl.
CPC ..... *F04C 18/0269* (2013.01); *F04C 18/0215* (2013.01)

(58) Field of Classification Search
CPC ..... F04C 18/0246; F04C 18/0269
See application file for complete search history.

(56) References Cited

U.S. PATENT DOCUMENTS

| | | | | |
|---|---|---|---|---|
| 3,600,114 | A | 8/1971 | Dvorak et al. | |
| 4,558,997 | A * | 12/1985 | Sakata et al. | 418/55.2 |
| 4,627,800 | A * | 12/1986 | Matsudaira et al. | 418/55.2 |
| 4,927,341 | A * | 5/1990 | Bush | 418/55.2 |
| 5,304,047 | A | 4/1994 | Shibamoto | |
| 5,364,247 | A * | 11/1994 | Fukanuma et al. | 418/55.2 |
| 5,938,417 | A | 8/1999 | Takao et al. | |
| 6,030,192 | A | 2/2000 | Hill et al. | |
| 6,120,268 | A * | 9/2000 | Bush et al. | 418/55.2 |
| 6,499,978 | B2 * | 12/2002 | Cho et al. | 418/55.2 |
| 6,736,622 | B1 * | 5/2004 | Bush et al. | 418/55.2 |
| 6,939,116 | B2 * | 9/2005 | Yamaji et al. | 418/55.2 |

(Continued)

FOREIGN PATENT DOCUMENTS

| | | | |
|---|---|---|---|
| CN | 1157883 | A | 8/1997 |
| EP | 0 049 480 | A1 | 4/1982 |

(Continued)

*Primary Examiner* — Russell Stormer
(74) *Attorney, Agent, or Firm* — Birch, Stewart, Kolasch & Birch, LLP

(57) ABSTRACT

A scroll compressor includes a fixed scroll having a fixed wrap, and an orbiting scroll having an orbiting wrap engaged with the fixed wrap to define a first compression chamber between an inner surface of the fixed wrap and an outer surface of the orbiting wrap, and to define a second compression chamber between an inner surface of the orbiting wrap and an outer surface of the fixed wrap. A rotation shaft is provided with an eccentric portion at one end thereof to drive the orbiting scroll. A protruding portion protrudes inwardly from an inner end of the fixed wrap, and contacts the orbiting wrap. A distance between a center of the eccentric portion and a tangent line at a contact point between the protruding portion and the orbiting wrap at an end of the first compression chamber is smaller than a radius of the eccentric portion.

18 Claims, 13 Drawing Sheets

AMENDED

(56) References Cited

U.S. PATENT DOCUMENTS

| | | | | |
|---|---|---|---|---|
| 7,341,438 | B2 * | 3/2008 | Uno et al. | 418/55.2 |
| 7,891,961 | B2 * | 2/2011 | Shimizu et al. | 418/55.1 |
| 2006/0210415 | A1 | 9/2006 | Ohtake | |
| 2008/0145253 | A1 * | 6/2008 | Uekawa | 418/55.2 |

FOREIGN PATENT DOCUMENTS

| | | | |
|---|---|---|---|
| EP | 0 682 181 | A2 | 11/1995 |
| JP | 62-126201 | A | 6/1987 |
| JP | 05-060078 | A | 3/1993 |
| JP | 07-054784 | A | 2/1995 |
| JP | 07-279602 | A | 10/1995 |
| JP | 07-332258 | A | 12/1995 |
| JP | 08-170592 | A | 7/1996 |
| JP | 8-232863 | A | 9/1996 |
| JP | 8-261172 | A | 10/1996 |
| JP | 08-326671 | A | 12/1996 |
| JP | 11-22665 | A | 1/1999 |
| JP | 2010-180704 | A | 8/2010 |

* cited by examiner (a) (b)

AMENDED (a)

(b)

SCROLL COMPRESSOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

[Pursuant to 35 U.S.C. §119(a), this application] *This application is a reissue application of U.S. Pat. No. 8,308,460 issued on Nov. 13, 2012, which* claims the benefit of the earlier filing date and the right of priority to Korean Applications No. 10-2011-0021108, filed on Mar. 9, 2011, [and 10-2011-0046492, filed on May 17, 2011] the contents of which is incorporated by reference herein in its entirety.

BACKGROUND OF THE INVENTION

1. Field of the Invention This invention relates to a scroll compressor, and more particularly, to a configuration of a fixed scroll and an orbiting scroll of the scroll compressor capable of obtaining a sufficient compression ratio.

2. Background of the Invention

A scroll compressor is a compressor which includes a fixed scroll having a fixed wrap and an orbiting scroll having an orbiting wrap engaged with the fixed wrap. In this configuration of the scroll compressor, as the orbiting scroll orbits on the fixed scroll, the volumes of compression chambers, which are formed between the fixed wrap and the orbiting wrap, consecutively change, thereby sucking and compressing a refrigerant.

The scroll compressor allows suction, compression and discharge to be consecutively performed, so it is very favorable, as compared to other types of compressors, in the aspect of vibration and noise generated during operation.

The behavior of the scroll compressor may be dependent on the shapes of the fixed wrap and the orbiting wrap. The fixed wrap and the orbiting wrap may have a random shape, but typically they have a shape of an involute curve, which is easy to manufacture. The involute curve refers to a curve corresponding to a track drawn by an end of a thread when unwinding the thread wound around a basic circle with a predetermined radius. When such an involute curve is used, the wrap has a uniform thickness, and a rate of volume change of the compression chamber in response to a rotated angle of the orbiting scroll is constantly maintained. Hence, the number of turns of the wrap should increase to obtain a sufficient compression ratio, which may, however, cause the compressor to be increased in size corresponding to the increased number of turns of the wrap.

The orbiting scroll typically includes a disk, and the orbiting wrap is located at one side of the disk. A boss is formed at a rear surface of the disk opposite to the side at which the orbiting wrap is formed. The boss is connected to a rotation shaft, which allows the orbiting scroll to perform an orbiting motion. Such an arrangement with the orbiting wrap on one side of the disk and the boss on the other side of the disk allows the orbiting wrap to be formed on almost an entire surface of the disk, thereby reducing a diameter of the disk for obtaining a particular compression ratio. However, a point of application of a driving force at the boss which is opposed to a force of a refrigerant upon compression between the fixed wrap and the orbiting wrap is perpendicularly spaced apart from the wraps. Because the boss is not in the same plane on the same surface as the orbiting wrap, the orbiting scroll is inclined during operation, thereby generating more vibration and noise.

SUMMARY OF THE INVENTION

To overcome the drawbacks of the background art, a scroll compressor is provided that is capable of reducing an entire size of the compressor while ensuring a sufficient compression ratio. The orbiting scroll of the present invention is configured so that the orbiting wrap and the coupling portion for the rotation shaft are located at the same surface in the same plane. This arrangement allows the repulsive force of the refrigerant and the reaction force to be applied in the same plane so as to solve the inclination problem of the orbiting scroll of the background art.

Because the rotation shaft extends up to the orbiting wrap, an end portion of the rotation shaft is located in the central portion of the orbiting wrap, which has been used as a compression chamber in the background art. Therefore, to obtain a sufficient compression ratio, the fixed wrap and the orbiting wrap are uniquely configured.

In one exemplary embodiment, a scroll compressor includes a fixed scroll having a fixed wrap, an orbiting scroll having an orbiting wrap, the orbiting wrap configured to define first and second compression chambers in an outer side surface and an inner side surface together with the fixed wrap, the orbiting scroll performing an orbiting motion with respect to the fixed scroll, a rotation shaft having an eccentric portion at one end thereof, the eccentric portion coupled to the orbiting wrap to overlap with each other in a lateral direction, and a driving unit configured to drive the rotation shaft.

In accordance with one aspect of the invention, the first compression chamber is defined between two contact points $P_1$ and $P_2$ generated by the contact of an inner side surface of the fixed wrap and an outer side surface of the orbiting wrap, wherein $\alpha<360°$ at least before initiating a discharge operation if a greater angle of angles defined by two lines, which connect a center O the eccentric portion to the two contact points $P_1$ and $P_2$, respectively, is $\alpha$.

In addition, $l>0$ if a distance between normal lines at the two contact points $P_1$ and $P_2$ is 1. Also, the normal lines drawn at the two contact points $P_1$ and $P_2$ may be different from each other.

A rotation shaft coupling portion may be formed through a central portion of the orbiting scroll. The rotation shaft coupling portion may have an outer circumferential surface defining a part of the orbiting wrap and be coupled with the eccentric portion inside thereof. If the first compression chamber is located at the outer circumferential surface of the rotation shaft coupling portion, $\alpha<360°$ and $l>0$.

The second compression chamber may contact the outer circumferential surface of the rotation shaft coupling portion with moving internally along an inner circumferential surface of the orbiting wrap and then communicate with the first compression chamber.

The rotation shaft may include a shaft portion connected to the driving unit, a pin portion formed at an end of the shaft portion to be concentric with the shaft portion, and an eccentric bearing eccentrically inserted in the pin portion. The eccentric bearing may be rotatably coupled to the rotation shaft coupling portion. The pin portion may be formed to be asymmetric.

In accordance with another aspect of the invention, if an inner contact point of the first compression chamber upon initiation of discharging is $P_3$ and an inner contact point of the first compression chamber 150° before initiating the discharge operation is $P_4$, a thickness of the fixed wrap is decreased and then increased as moving from $P_3$ to $P_4$. The fixed wrap may have the maximum thickness between $P_3$ and an inner end portion of the fixed wrap.

In accordance with another aspect of the invention, if a distance between an inner circumferential surface of the fixed wrap and a shaft center of the rotation shaft is $D_F$, an inner contact point of the first compression chamber upon initiation of discharging is $P_3$ and an inner contact point of the first compression chamber 150° before initiating the discharge operation is $P_4$, the distance $D_F$ is increased and then decreased.

In accordance with another aspect of the invention, if a distance between a center of the eccentric portion and an outer circumferential surface of the orbiting wrap is $D_O$, an inner contact point of the first compression chamber upon initiation of discharging is $P_3$ and an inner contact point of the first compression chamber 150° before initiating the discharge operation is $P_4$, the distance $D_O$ is increased and then decreased as moving from $P_3$ to $P_4$.

In accordance with another aspect of the invention, a rotation shaft coupling portion is formed in a central portion of the orbiting scroll, the eccentric portion coupled to the rotation shaft coupling portion, wherein a protruding portion protrudes from an inner circumferential surface of an inner end of the fixed wrap, and a recess portion is recessed at an outer circumferential surface of the rotation shaft coupling portion, the recess portion contacting at least part of the protruding portion.

In accordance with another aspect of the invention, a rotation shaft coupling portion is formed at a central portion of the orbiting scroll, the rotation shaft coupling portion having an outer circumferential surface configuring a part of the orbiting wrap and having the eccentric portion coupled therein, wherein if an inner contact point of the first compression chamber upon initiation of discharging is $P_3$ and an inner contact point of the first compression chamber 90° prior to initiation of discharging is $P_5$, $R_m$ defined by the following equation is smaller than an inner radius $R_H$ of the rotation shaft coupling portion at an interval between $P_3$ and $P_5$:

$$R_m = \frac{1}{90}\int_0^{90} R_\theta \, d\theta$$

where $R_{74}$ is a radius of curvature of the orbiting wrap at the inner contact point of the first compression chamber when a rotation angle of the rotation shaft is θ. Here, $R_m$ may be smaller than $R_H/1.4$, and in more detail, $R_m$ may be smaller than 10.5 mm.

In accordance with another aspect of the invention, if an inner contact point of the first compression chamber upon initiation of discharging is $P_3$, a *shortest* distance between a tangent line at $P_3$ and a center O of the eccentric portion is smaller than a [diameter] *radius* of the eccentric portion.

In accordance with these aspects of the invention, the compression ratio of the first compression chamber can be increased as compared to a scroll compressor having a fixed wrap and an orbiting wrap having an involute shape. In addition, as a thickness of an inner end portion of the fixed wrap varies, wrap rigidity can be enhanced and leakage prevention capability can be improved.

Further scope of applicability of the present application will become more apparent from the detailed description given hereinafter. However, it should be understood that the detailed description and specific examples, while indicating particular embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Hereinafter, description will be made in detail to the exemplary embodiments of a scroll compressor according to this invention with reference to the accompanying drawings.

Figure 1:
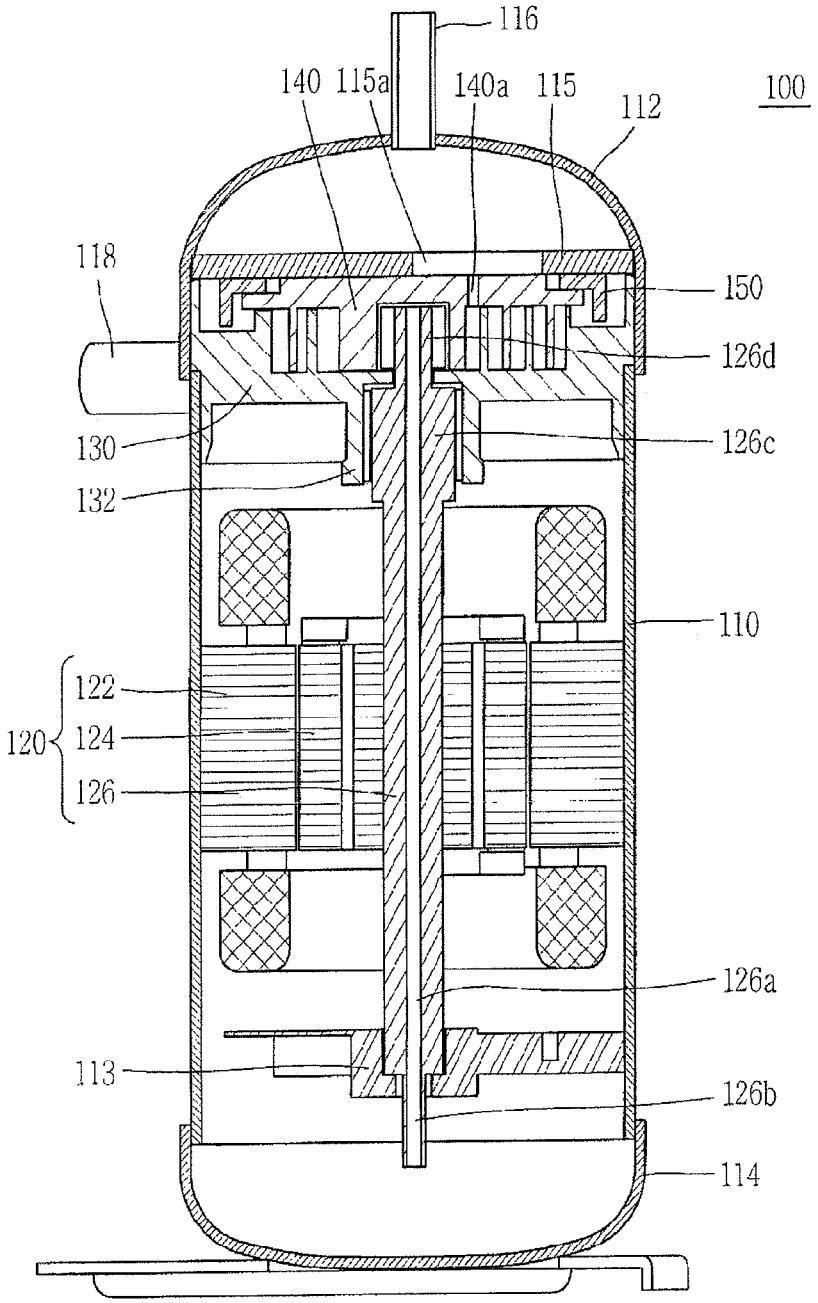
FIG. 1 is a sectional view schematically showing an inner structure of a scroll compressor in accordance with one exemplary embodiment.

As shown in FIG. 1, the exemplary embodiment may include a hermetic compressor 100 having a cylindrical casing 110, and an upper shell 112 and a lower shell 114 for covering upper and lower portions of the casing 110. The upper and lower shells 112 and 114 may be welded to the casing 110 so as to define a single hermetic space together with the casing 110. A lower space of the hermetic compressor 100 may define a suction space, and an upper space thereof may define a discharging space. The lower and upper spaces may be divided based upon an upper frame 115 to be explained later.

A discharge pipe 116 may be connected to an upper side of the upper shell 112. The discharge pipe 116 may act as a path through which a compressed refrigerant is discharged to the outside. An oil separator (not shown) for separating oil mixed with the discharged refrigerant may be connected to the discharge pipe 116. A suction pipe 118 may be installed at a side surface of the casing 110. The suction pipe 118 may act as a path through which a refrigerant to be compressed is introduced. Referring to FIG. 1, the suction pipe 118 is located at an interface between the casing 110 and the upper shell 116, but the position of the suction pipe 118 is not limited to this example. In addition, the lower shell 114 may function as an oil chamber for storing oil, which is supplied to make the compressor work smoothly.

A motor 120 as a driving unit may be installed at an approximately central portion within the casing 110. The motor 120 may include a stator 122 fixed to an inner surface of the casing 110, and a rotor 124 located within the stator 122 and rotatable by interaction with the stator 122. A rotation shaft 126 may be disposed in the center of the rotor 124 so as to be rotatable together with the rotor 124.

An oil passage 126a may be formed in the center of the rotation shaft 126 along a lengthwise direction of the rotation shaft 126. An oil pump 126b for pumping up oil stored in the lower shell 114 may be installed at a lower end portion of the rotation shaft 126. The oil pump 126b may be implemented by forming a spiral recess or separately installing an impeller in the oil passage 126a, or may be a separately welded pump.

A diameter-extended part 126c, which is inserted in a boss formed in a fixed scroll to be explained later, may be disposed at an upper end portion of the rotation shaft 126. The diameter-extended part 126c may have a diameter greater than other parts. A pin portion 126d may be formed at an end of the diameter-extended part 126c. Alternatively, the diameter-extended part 126c may not be utilized, and the entire rotation shaft 126 may have a specific diameter.

Figure 2:
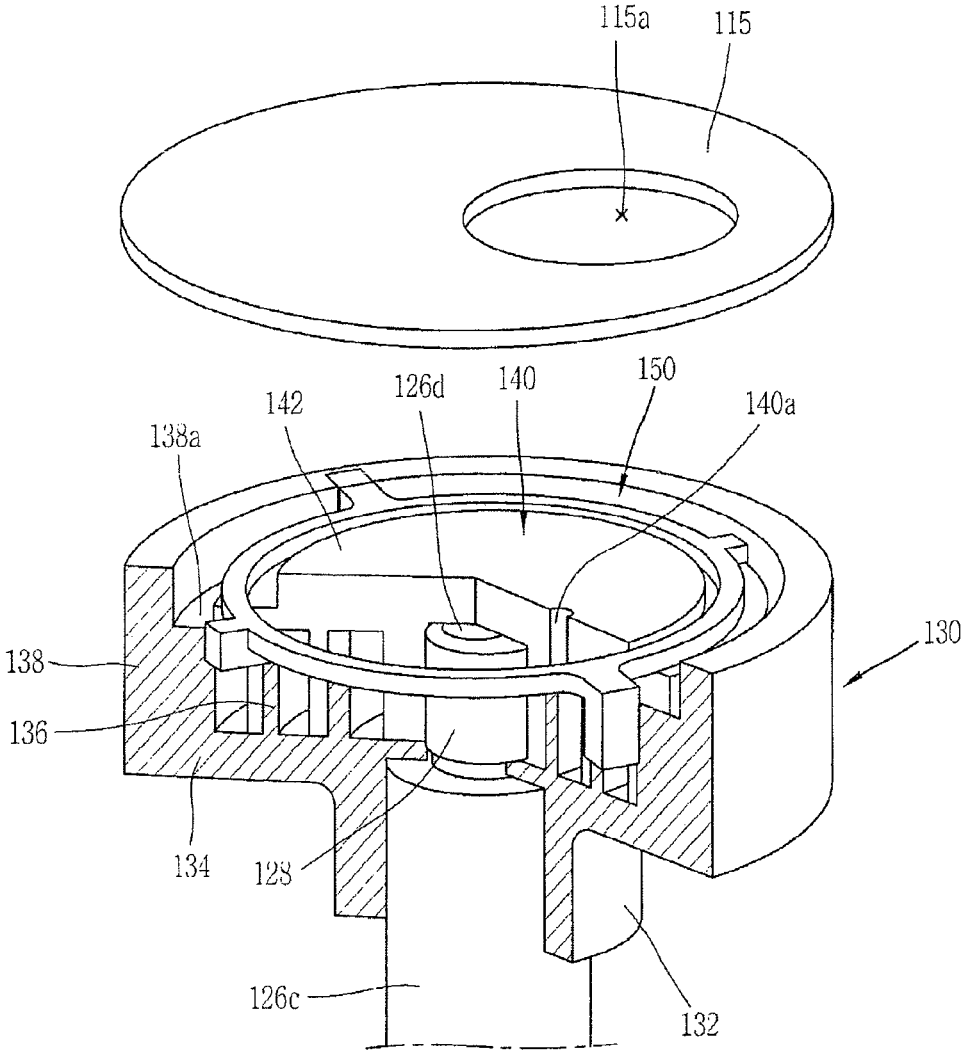
FIG. 2 is a partially cut-away view showing a compression unit of the exemplary embodiment shown in FIG. 1.
Figure 3:
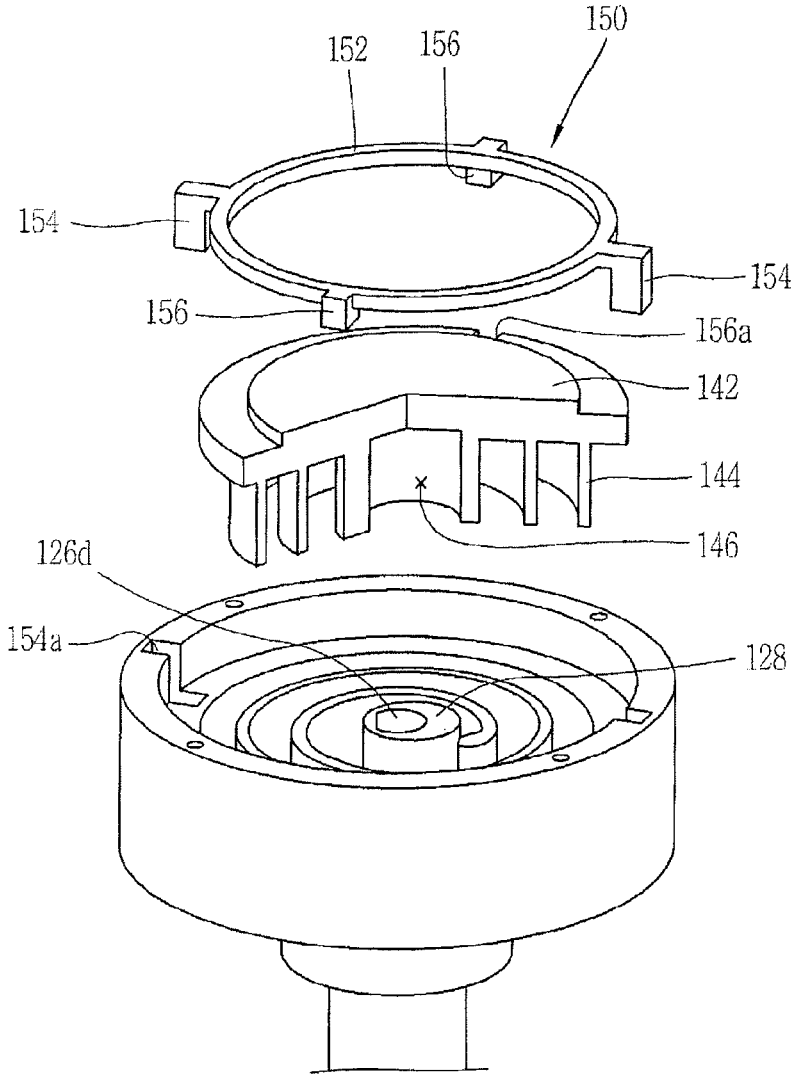
FIG. 3 is a disassembled perspective view of the compression unit shown in FIG. 2.

An eccentric bearing 128 may be inserted on the pin portion 126d, as shown in FIG. 2. Referring to FIG. 3, the eccentric bearing 128 may eccentrically be inserted on the pin portion 126d. A coupled portion between the pin portion 126d and the eccentric bearing 128 may have a shape like the letter "D" such that the eccentric bearing 128 cannot be rotated with respect to the pin portion 126d.

A fixed scroll 130 may be mounted at a boundary portion between the casing 110 and the upper shell 112. The fixed scroll 130 may have an outer circumferential surface, which is shrink-fitted between the casing 110 and the upper shell 112. Alternatively, the fixed scroll 130 may be welded with the casing 110 and the upper shell 112.

A boss 132, in which the rotation shaft 126 is inserted, may be formed at a lower surface of the fixed scroll 130. A through hole through which the pin portion 126d of the rotation shaft 126 is inserted, may be formed through an upper surface of the boss 132, as shown in FIG. 1. Accordingly, the pin portion 126d can protrude to an upper side of a disk 134 of the fixed scroll 130 through the through hole.

A fixed wrap 136, which is engaged with an orbiting wrap to be explained later so as to define compression chambers, may be formed at an upper surface of the disk 134. A side wall 138 may be located at an outer circumferential portion of the disk 134. The side wall 138 may define a space for housing an orbiting scroll 140 to be explained later and be contactable with an inner circumferential surface of the casing 110. An orbiting scroll support 138a, on which an outer circumferential portion of the orbiting scroll 140 is received, may be formed inside an upper end portion of the side wall 138. A height of the orbiting scroll support 138a may have the same height as the fixed wrap 136 or be slightly lower than the fixed wrap 136, such that an end of the orbiting wrap can contact a surface of the disk 134 of the fixed scroll 130.

The orbiting scroll 140 may be disposed on the fixed scroll 130. The orbiting scroll 140 may include a disk 142 having an approximately circular shape and an orbiting wrap 144 engaged with the fixed wrap 136. A rotation shaft coupling portion 146 in an approximately circular shape may be formed into the central portion of the disk 142 such that the eccentric bearing 128 can be rotatably inserted therein. An outer circumferential portion of the rotation shaft coupling portion 146 may be connected to the orbiting wrap 144 so as to define compression chambers together with the fixed wrap 136 during compression, which will be described later.

The eccentric bearing 128 may be inserted into the rotation shaft coupling portion 146, and the end portion of the rotation shaft 126 may be inserted through the disk 134 of the fixed scroll 130, so that the orbiting wrap 144, the fixed wrap 136 and the eccentric bearing 128 may overlap in a lateral direction of the compressor. Upon compression, a repulsive force of a refrigerant may be applied to the fixed wrap 136 and the orbiting wrap 144, while a compression force as a reaction force against the repulsive force may be applied between the rotation shaft coupling portion 146 and the eccentric bearing 128. As such, when the shaft is partially inserted through the disk and overlaps with the wrap, the repulsive force of the refrigerant and the compression force may be applied to the same side surface based on the disk, thereby being attenuated by each other. Consequently, the orbiting scroll 140 can be obviated from being inclined due to the compression force and the repulsive force. As alternate example, an eccentric bush may be installed instead of the eccentric bearing. In this example, an inner surface of the rotation shaft coupling portion 146, in which the eccentric bush is inserted, may be specifically processed to serve as a bearing. Also, another example of installing a separate bearing between the eccentric bush and the rotation shaft coupling portion may be conceived.

A discharge hole 140a may be formed at the disk 142 such that a compressed refrigerant can be discharged into the casing. The position and shape of the discharge hole 140a may be determined by considering a required discharge pressure or the like. The disk 142 may further include a bypass hole in addition to the discharge hole 140a. When the bypass hole is farther away from the center of the disk 142 than the discharge hole 140a, the bypass hole may have a diameter greater than one third of an effective diameter of the discharge hole 140a.

An Oldham ring 150 for preventing rotation of the orbiting scroll 140 may be installed on the orbiting scroll 140. The Oldham ring 150 may include a ring part 152 having an approximately circular shape and inserted on a rear surface of the disk 142 of the orbiting scroll 140, and a pair of first keys 154 and a pair of second keys 156 protruding to one side surface of the ring part 152. The first keys 154 may protrude longer than a thickness of an outer circumferential portion of the disk 142 of the orbiting scroll 140, thereby being inserted into first key recesses 154a, which are recessed over an upper end of the side wall 138 of the fixed scroll 130 and the orbiting scroll support 138a. In addition, the second keys 156 may be inserted into second key recesses 156a, which are formed at the outer circumferential portion of the disk 142 of the orbiting scroll 140.

Each of the first key recesses 154a may have a perpendicular portion extending upwardly and a horizontal portion extending in a right-and-left direction. During an orbiting motion of the orbiting scroll 140, a lower end portion of each first key 154 remains inserted in the horizontal portion of the corresponding first key recess 154a while an outer end portion of the first key 154 in a radial direction is separated from the perpendicular portion of the first key recess 154a. That is, the first key recesses 154a and the fixed scroll 130 are coupled to each other in a perpendicular direction, which may allow reduction of a diameter of the fixed scroll 130.

In detail, a clearance (air gap) as wide as an orbiting radius should be ensured between the disk 142 of the orbiting scroll 140 and an inner wall of the fixed scroll 130. If the keys of an Oldham ring are coupled to a fixed scroll in a radial direction, key recesses formed at the fixed scroll should be longer than at least the orbiting radius in order to prevent the Oldham ring from being separated from the key recesses during orbiting motion. However, this structure may cause an increase in the size of the fixed scroll.

On the other hand, as shown in the exemplary embodiment, if the second key recess 156a extend down to a lower side of a space between the disk 142 of the orbiting scroll 140 and the orbiting wrap 144, a sufficient length of the key recess 156a can be ensured even without increasing the size of the fixed scroll 130.

In addition, in the exemplary embodiment, all the keys of the Oldham ring 150 are formed at the one side surface of the ring part 152. This structure can thus reduce the perpendicular height of a compression unit as compared to forming keys at both side surfaces.

Meanwhile, as shown in FIG. 1, a lower frame 113 for rotatably supporting a lower side of the rotation shaft 126 may be installed at a lower side of the casing 110, and an upper frame 115 for supporting the orbiting scroll 140 and the Oldham ring 150 may be installed on the orbiting scroll 140. A hole 115a is formed in the upper frame 115. The hole 115a may communicate with a discharge hole 140a of the orbiting scroll 140 to allow a compressed refrigerant to be discharged therethrough toward the upper shell 112.

Hereinafter, prior to explaining the shape of a fixed scroll and an orbiting scroll of the present invention, a description will be given of an example with an orbiting wrap and a fixed wrap each having an involute form to help understanding the invention.

Figure 4:
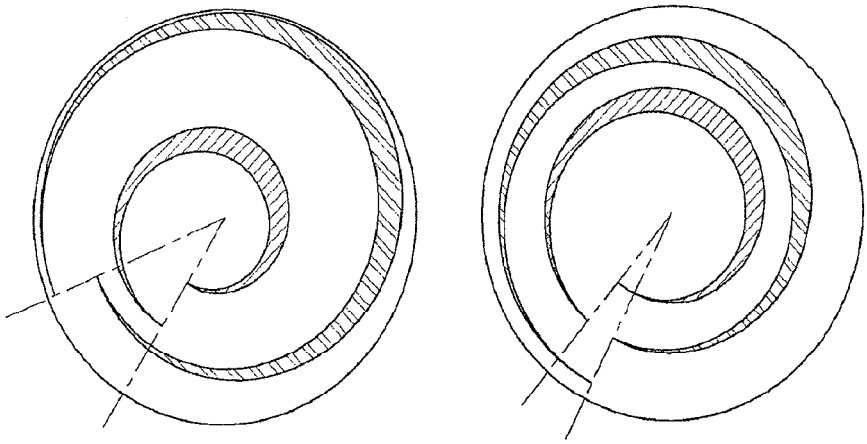
FIGS. 4(a) and 4(b) are schematic views showing first and second compression chambers right after suction and right before discharge in a scroll compressor having an orbiting wrap and a fixed wrap in the involute shape.

FIGS. 4(a) and 4(b) are planar views showing a compression chamber right after a suction operation and a compression chamber right before a discharge operation in a scroll compressor having an orbiting wrap and a fixed wrap formed as an involute curve and having a shaft partially inserted through a disk. FIG. 4(a) shows the change of a first compression chamber defined between an inner side surface of the fixed wrap and an outer side surface of the orbiting wrap, and FIG. 4(b) shows the change of a second compression chamber defined between an inner side surface of the orbiting wrap and an outer side surface of the fixed wrap.

In the configuration of a scroll compressor, a compression chamber is defined between two contact points generated by contact between the fixed wrap and the orbiting wrap. Upon having the fixed wrap and the orbiting wrap having an involute curve, as shown in FIGS. 4(a) and 4(b), two contact points defining one compression chamber are present on a line. In other words, the compression chamber extends 360° with respect to the center of the rotation shaft.

Regarding a volume change of the first compression chamber shown in FIG. 4(a), the volume of the compression chamber is gradually reduced moving toward the central portion in response to the orbiting motion of the orbiting scroll. Thus, when arriving at an outer circumferential portion of a rotation shaft coupling portion located at the center of the orbiting scroll, the first compression chamber has the minimum volume value. For the fixed wrap and the orbiting wrap having the involute curve, the volume reduction rate linearly decreases as an orbiting angle (hereinafter, referred to as 'crank angle') of the rotation shaft increases. Hence, to acquire a high compression ratio, the compression chamber should move as close as possible toward the center. However, when the rotation shaft is present at the central portion, the compression chamber may only move inward to the outer circumferential portion of the rotation shaft. Accordingly, the compression ratio is lowered. A compression ratio of about 2.13:1 is exhibited in FIG. 4(a).

Meanwhile, the second compression chamber shown in FIG. 4(b) has a much lower compression ratio than the first compression chamber, being about 1.46:1. However, regarding the second compression chamber, if the shape of the orbiting scroll is changed such that a connected portion between a rotation shall coupling portion P and the orbiting wrap is formed in an arcuate shape, a compression path of the second compression chamber until before a discharge operation extends, thereby increasing the compression ratio up to about 3.0. In this case, the second compression chamber may extend less than 360° right before the discharge operation. However, this method may not be applied to the first compression chamber.

Therefore, when the fixed wrap and the orbiting wrap have the involute shape, the second compression chamber may have a high compression ratio but the first compression chamber may not. Also, when the two compression chambers have a remarkable difference of their compression ratios, it may badly affect the operation of the compressor and even may lower the overall compression ratio.

To solve the problem, the exemplary embodiment shows the fixed wrap and the orbiting wrap having a different curve (shape) from the involute curve. FIGS. 6(a)-6(e) show a process of deciding shapes of the fixed wrap and the orbiting wrap according to the exemplary embodiment. In FIGS. 6(a)-6(e), a solid line indicates a generating curve for the first compression chamber and a dotted line indicates a generating curve for the second compression chamber.

Here, the generating curve refers to a track drawn by a particular shape during movement. The solid line indicates a track drawn by the first compression chamber during suction and discharge operations, and the dotted line indicates the track of the second compression chamber. Hence, if the generating curve is moved in parallel to both sides as long as the orbiting radius of the orbiting scroll based upon the solid line, it exhibits the shapes of an inner side surface of the fixed wrap and an outer side surface of the orbiting wrap. If the generating curve is moved in parallel based upon the dotted line, it exhibits the shapes of an outer side surface of the fixed wrap and an inner side surface of the orbiting wrap.

Figure 5:
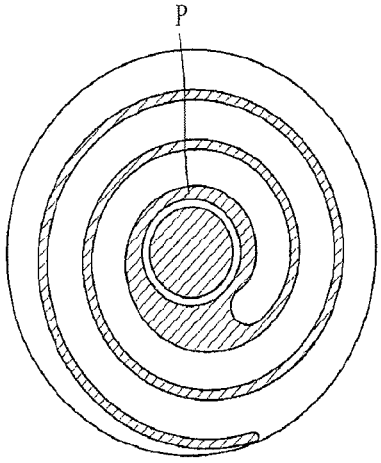
FIG. 5 is a planar schematic view showing an orbiting wrap with an involute shape.
Figure 6:
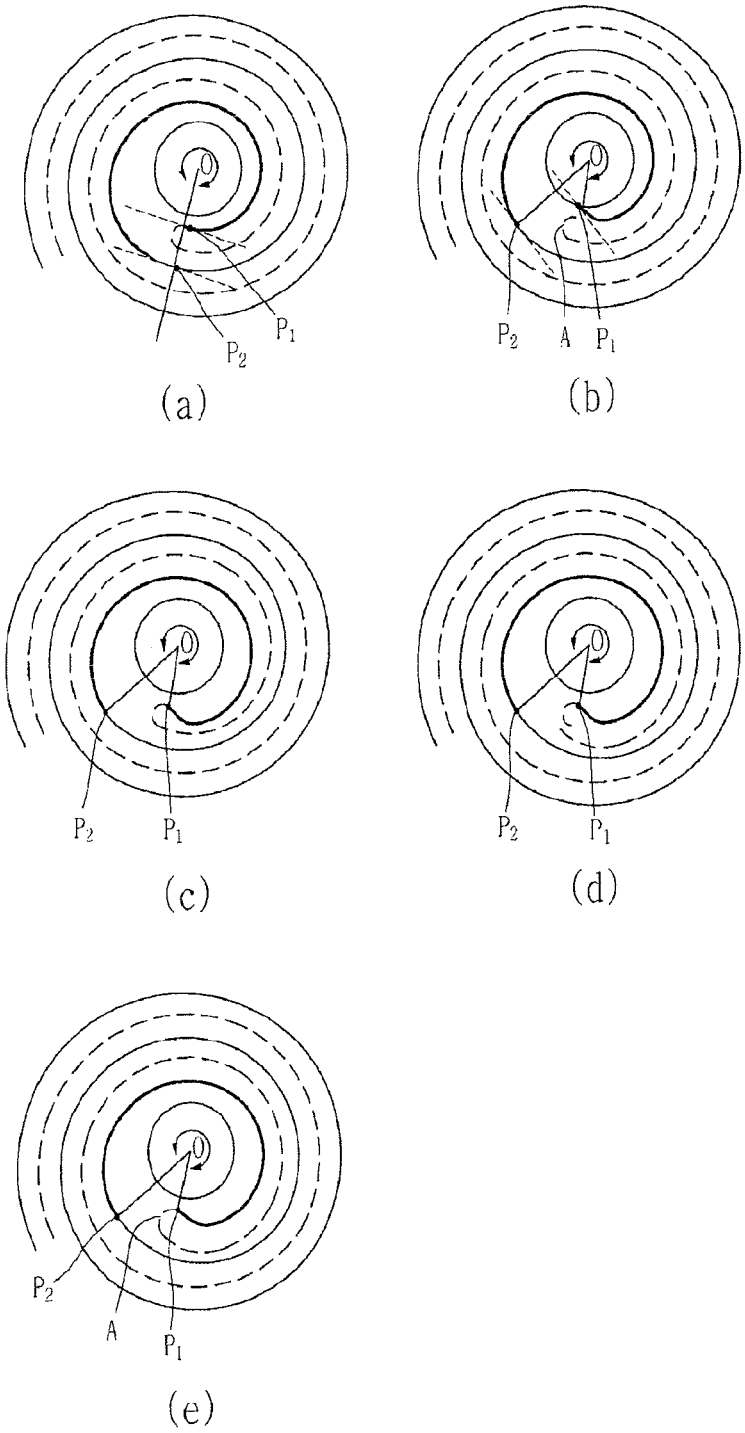
FIGS. 6(a)-6(e) are views showing a process for obtaining generating curves in the scroll compressor of the one exemplary embodiment.

FIG. 6(a) shows a generating curve corresponding to having the wrap shape shown in FIG. 5. Here, a part indicated by a bold line corresponds to the first compression chamber right before a discharge operation. As shown, a start point and an end point are present on a line. In this case, it is difficult to obtain a sufficient compression ratio. Thus, as shown in FIG. 6(b), an end portion of the bold line, located outside, is transferred in a clockwise direction along the generating curve and an end portion located inside is transferred up to a point to be contactable with the rotation shaft coupling portion. That is, a portion of the generating curve, adjacent to the rotation shaft coupling portion, may be curved to have a smaller radius of curvature.

As described above, in the aspect of the characteristic of the scroll compressor, the compression chamber is formed by two contact points where the orbiting wrap and the fixed wrap contact each other. Both ends of the bold line in FIG. 6(a) correspond to the two contact points. Normal vectors at the respective contact points are in parallel to each other according to the operating algorithm of the scroll compressor. Also, the normal vectors are in parallel to a line connecting a center of the rotation shaft and a center of the eccentric bearing. Here, for the fixed wrap and the orbiting wrap having the involute shape, the two normal vectors are in parallel to each other and also present on the same line as shown in FIG. 6(a).

In FIG. 6(a), if it is assumed that the center of the rotation shaft coupling portion 146 is O and two contact points are $P_1$ and $P_2$, $P_2$ is located on a line connecting O and $P_1$. If it is assumed that a larger angle of angles formed by lines $OP_1$ and $OP_2$ is $\alpha$, $\alpha$ is 360°. In addition, if it is assumed that a distance between the normal vectors at $P_1$ and $P_2$ is l, l is 0.

The inventors have observed from the research that when $P_1$ and $P_2$ are transferred more internally along the generating curves, the compression ratio of the first compression chamber can be improved. To this end, when $P_1$ is transferred toward the rotation shaft coupling portion 146, namely, the generating curve for the first compression chamber is transferred by turning toward the rotation shaft coupling portion 146, $P_1$, which has the normal vector in parallel to the normal vector at $P_2$, then rotates in a clockwise direction based on FIG. 6(b), as compared to FIG. 6(a), thereby being located at the rotated point. As described above, the first compression chamber is reduced in volume by being transferred more internally along the generating curve. Hence, the first compression chamber shown in FIG. 6(b) may be transferred more internally as compared to FIG. 6(a), and further compressed as much as being transferred, thereby obtaining an increased compression ratio.

Referring to FIG. 6(b), the point $P_1$ is excessively close to the rotation shaft coupling portion 146, and therefore the rotation shaft coupling portion 146 becomes thinner in thickness. Hence, the point $P_1$ is transferred back so as to modify the generating curve as shown in FIG. 6(c). Here, in FIG. 6(c), the generating curves of the first and second compression chambers are excessively close to each other, which makes a wrap thickness too thin or prevents a wrap from being physically formed. Thus, as shown in FIG. 6(d), the generating curve of the second compression chamber may be modified such that the two generating curves can maintain a predetermined interval therebetween.

Furthermore, the generating curve of the second compression chamber is modified, as shown in FIG. 6(e), such that an arcuate portion A located at the end of the generating curve of the second compression chamber is contactable with the generating curve of the first compression chamber. The generating curves may be modified to continuously maintain a predetermined interval therebetween. When a radius of the arcuate portion A of the generating curve of the second compression chamber is increased to ensure a wrap rigidity at the end of the fixed wrap, generating curves having the shape shown in FIG. 7 may be obtained.

Figure 7:
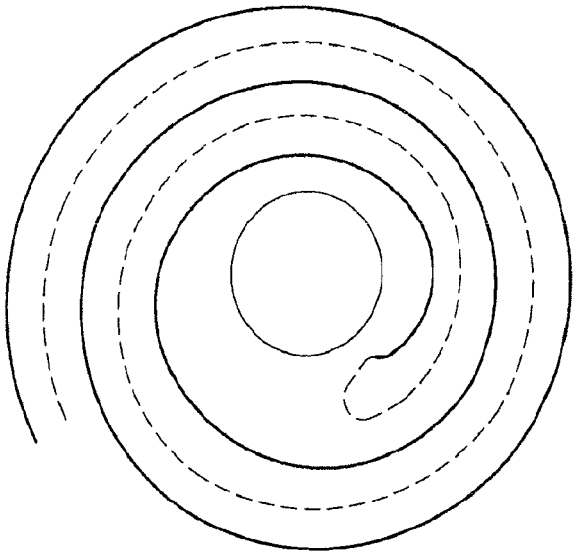
FIG. 7 is a planar view showing the final generating curves shown in FIGS. 6(a)-6(e).
Figure 8:
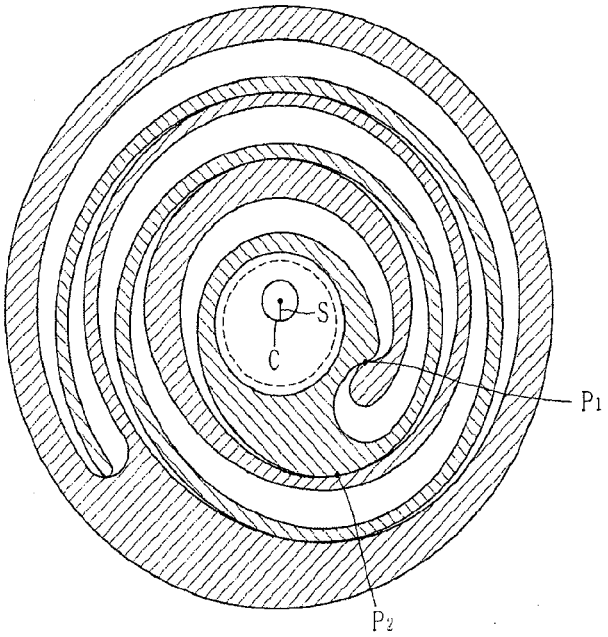
FIG. 8 is a planar view showing an orbiting wrap and a fixed wrap formed by the generating curve shown in FIG. 7.
Figure 9:
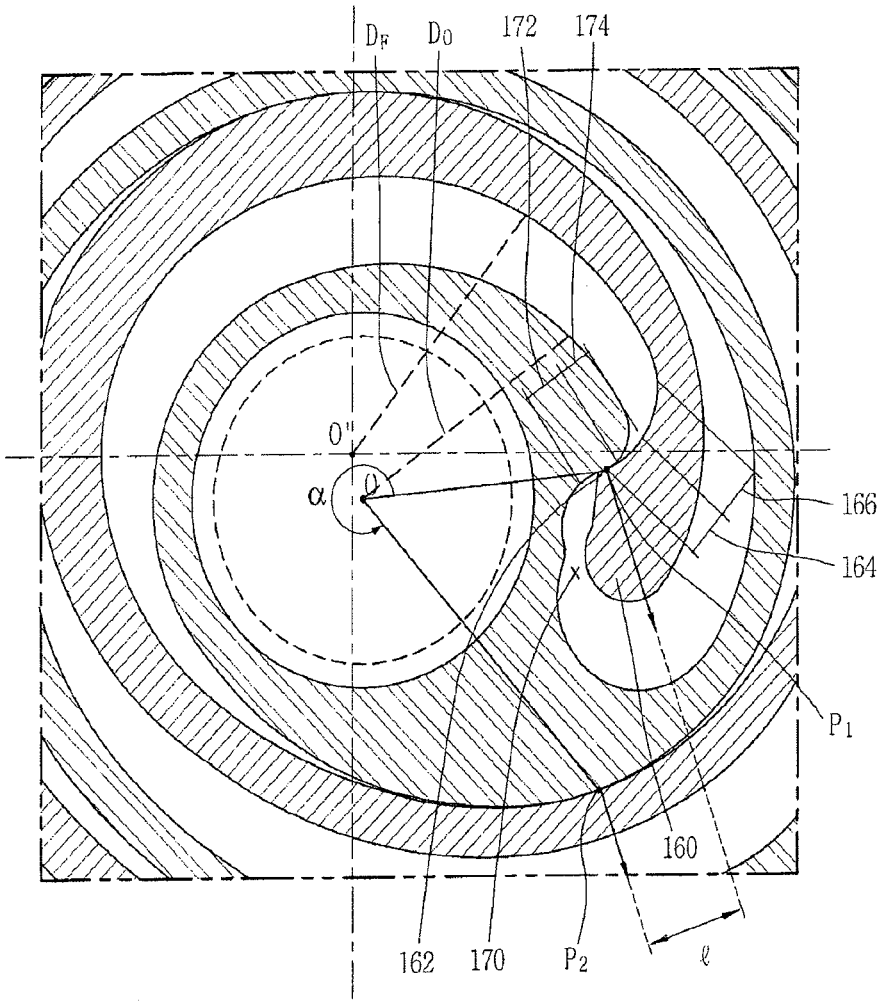
FIG. 9 is an enlarged planar view of a central portion of FIG. 8.

FIG. 8 is a planar view showing an orbiting wrap and a fixed wrap obtained based on the generating curves of FIG. 7, and FIG. 9 is an enlarged planar view of the central portion of FIG. 8. For reference, FIG. 8 shows a position of the orbiting wrap at a time point of initiating the discharge operation in the first compression chamber. Here, the point $P_1$ in FIG. 8 indicates a point, which is present inside, of two contact points defining a compression chamber, at the moment when initiating discharging in the first compressor chamber. Line S is a virtual line for indicating a position of the rotation shaft and circle C is a track drawn by the line S. Hereinafter, the crank angle is set to 0° when the line S is present in a state shown in FIG. 8, namely, when initiating discharging, set to a negative (−) value when rotated counterclockwise, and set to a positive (+) value when rotated clockwise.

Referring to FIGS. 8 and 9, it can be exhibited that an angle $\alpha$ defined by two lines, which connect the two contact points $P_1$ and $P_2$ respectively to the center O of the rotation shaft coupling portion is smaller than 360°, and a distance l between the normal vectors at each of the contact points $P_1$ and $P_2$ is greater than 0. Accordingly, the first compression chamber right before a discharge operation can have a smaller volume than that defined by the fixed wrap and the orbiting wrap having the involute shape, which results in an increase in the compression ratio. In addition, the orbiting wrap and the fixed wrap shown in FIG. 8 have a shape that a plurality of arcs having different diameters and origins are connected and the outermost curve may have an approximately oval shape with a major axis and a minor axis.

Figure 10:
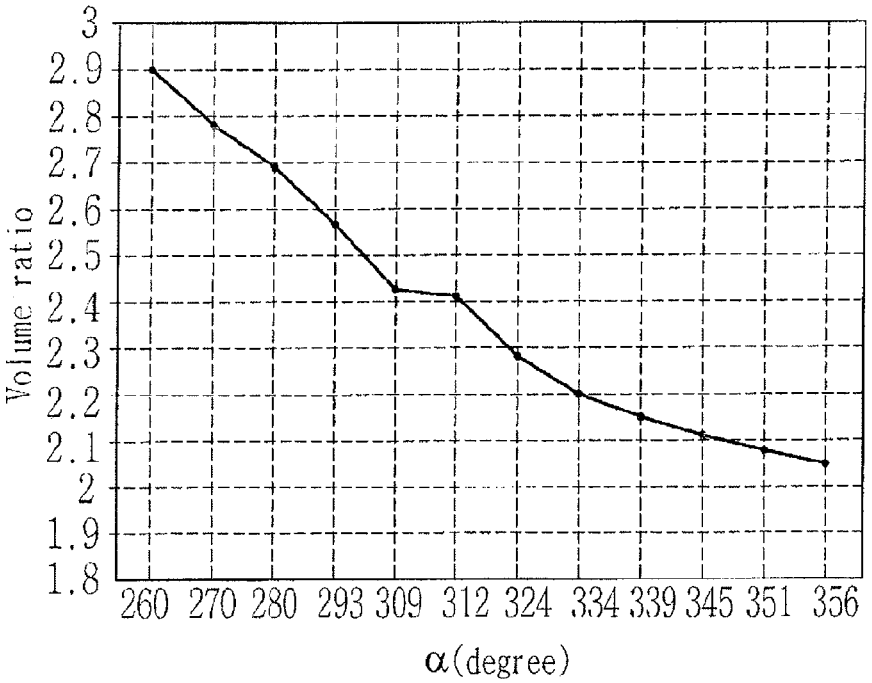
FIG. 10 is a graph showing a relationship between an angle α and a compression ratio.

In the exemplary embodiment, the angle $\alpha$ may be set to have a value in the range of 270° to 345°. FIG. 10 is a graph showing the angle $\alpha$ and a compression ratio. From the perspective of improvement of a compression ratio, it may be advantageous to set the angle $\alpha$ to have a low value. However, if the angle $\alpha$ is smaller than 270°, it may inhibit mechanical processing, thereby deriving bad productivity and increasing a price of a compressor. If the angle $\alpha$ exceeds 345°, the compression ratio may be lowered below 2.1, thereby failing to provide a sufficient compression ratio.

In addition, a protruding portion 160 may protrude from near an inner end of the fixed wrap toward the rotation shaft coupling portion 146. A contact portion 162 may further be formed by protruding from the protruding portion 160. That is, the inner end of the fixed wrap 130 may be thicker than other portions. Accordingly, the wrap rigidity of the inner end of the fixed wrap, to which the strongest compression force is applied, can be improved, resulting in enhanced durability.

The thickness of the fixed wrap is gradually decreased, starting from the inner contact point $P_1$ of the two contact points defining the first compression chamber upon initiating the discharge operation, as shown in FIG. 9. More particularly, a first part 164 may be formed adjacent to the contact point $P_1$ and a second part 166 may extend from the first part 164. A thickness reduction rate at the first part 164 may be higher than that at the second part 166. After the second part 166, the fixed wrap may be increased in thickness within a predetermined interval.

Figure 15:
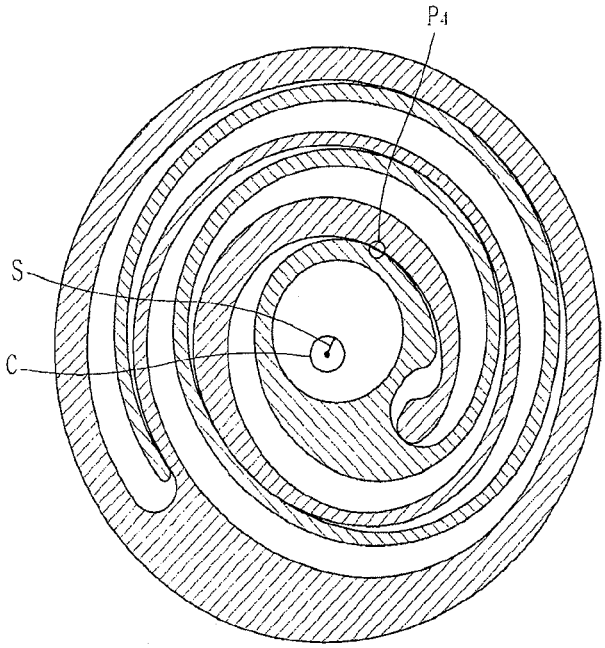
FIG. 15 is a planar view showing a state that the orbiting wrap contacts with the fixed wrap at point $P_4$.

If it is assumed that a distance between an inner side surface of the fixed wrap and a center O' of the rotation shaft is $D_F$, the distance $D_F$ may be increased and then decreased moving away from $P_1$ in a counterclockwise direction (based on FIG. 9), and such interval is shown in FIG. 15. FIG. 15 is a planar view showing the position of the orbiting wrap 150° before initiating the discharge operation, namely, when the crank angle is 210°. If the rotation shaft rotates 150° more from the state of FIG. 15, it reaches the state shown in FIG. 9. Referring to FIG. 15, an inner contact point $P_4$ of two contact points defining the first compression chamber is located above the rotation shaft coupling portion 146, and the $D_F$ is increased and then decreased at the interval from $P_1$ of FIG. 9 to $P_4$ of FIG. 15.

The rotation shaft coupling portion 146 may be provided with a recess portion 170 engaged with the protruding portion 160. One side wall of the recess portion 170 may contact the contact portion 162 of the protruding portion 160 to define one contact point of the first compression chamber. If it is assumed that a distance between the center O of the rotation shaft coupling portion 146 and an outer circumferential portion of the rotation shaft coupling portion 146 is $D_O$, the distance $D_O$ may be increased and then decreased along the interval between $P_1$ of FIG. 9 and $P_4$ of FIG. 15. Similarly, the thickness of the rotation shaft coupling portion 146 may also be increased and then decreased along the interval between $P_1$ of FIG. 9 and $P_4$ of FIG. 15.

The one side wall of the recess portion 170 may include a first increase part 172 at which a thickness is relatively greatly increased, and a second increase part 174 extending from the first increase part 172 and having a thickness increased at a relatively low rate. These correspond to the first part 164 and the second part 166 of the fixed wrap 136. The first increase part 172, the first part 164, the second increase part 174 and the second part 166 may be obtained by turning the generating curve toward the rotation shaft coupling portion 146 at the step of FIG. 6(b). Accordingly, the inner contact point $P_1$ defining the first compression chamber may be located at the first and second increase parts 172, 174, and also the length of the first compression chamber right before the discharge operation may be shortened so as to enhance the compression ratio.

Another side wall of the recess portion 170 may have an arcuate shape. A diameter of the arc may be determined based on the wrap thickness of the end of the fixed wrap 136 and the orbiting radius of the orbiting wrap 144. When the thickness of the end of the fixed wrap increases, the diameter of the arc increases. Accordingly, the thickness of the orbiting wrap near the arc may increase to ensure durability, and the compression path may also extend so as to increase the compression ratio of the second compression chamber.

Figure 16:
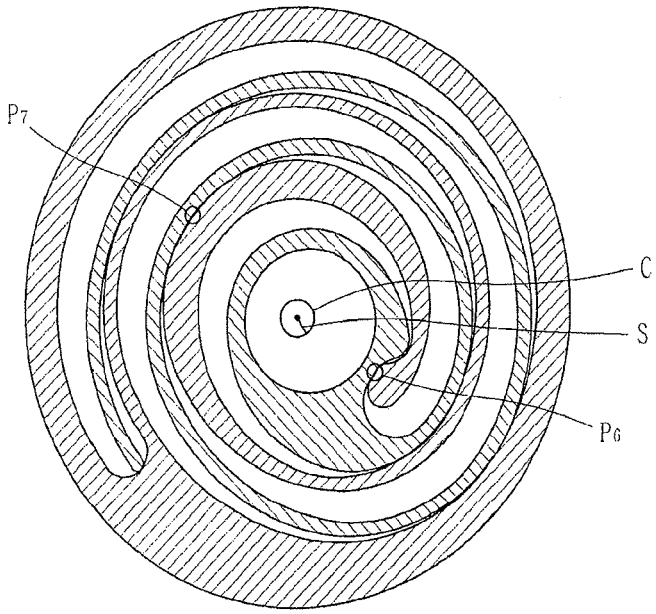
FIG. 16 is a planar view showing a time point when initiating a discharge operation in a second compression chamber in the exemplary embodiment of FIG. 8.

The central portion of the recess portion 170 may form a part of the second compression chamber. FIG. 16 is a planar view showing the position of the orbiting wrap when initiating the discharge operation in the second compression chamber. Referring to FIG. 16, the second compression chamber is defined between two contact points $P_6$ and $P_7$ and contacts an arcuate side wall of the recess portion 170. When the rotation shaft rotates more, one end of the second compression chamber may pass through the center of the recess portion 170.

Figure 11:
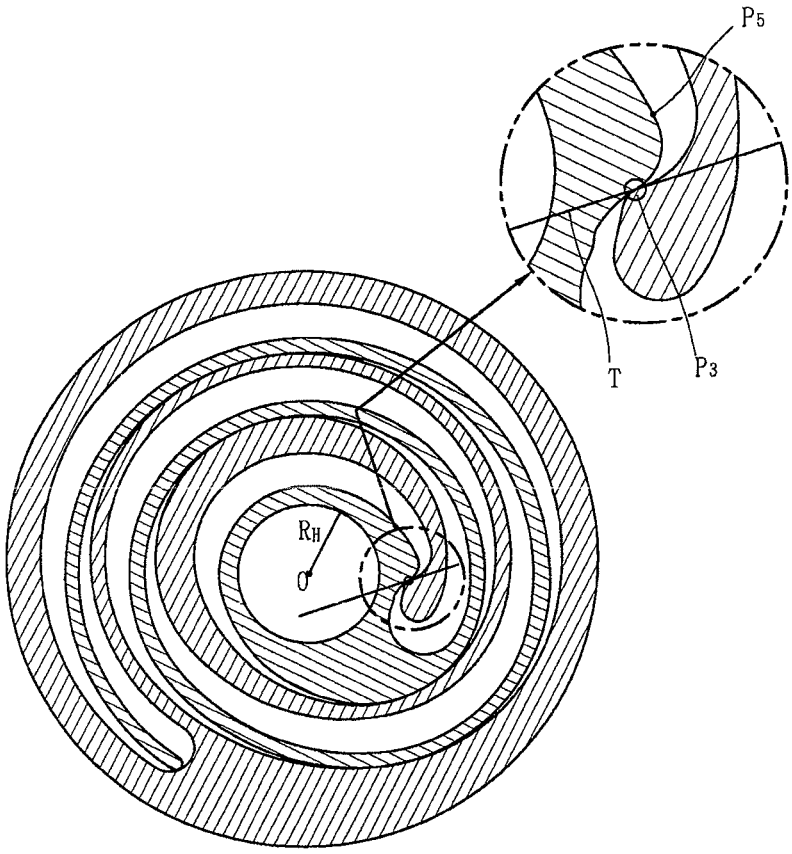
FIG. 11 is a planar view showing a state that the orbiting wrap contacts with the fixed wrap at point $P_3$.

FIG. 11 is another planar view showing a state that is also shown in FIG. 9. Referring to FIG. 11, a tangent line T drawn at the point $P_3$, which is the same as point $P_1$ of FIG. 9, passes through the inside of the rotation shaft coupling portion. This results from the behavior that the generating curve is curved inwardly during the process of FIG. 6(b). Consequently, a *shortest* distance between the tangent line T and a center of the rotation shaft coupling portion O is smaller than a radius $R_H$ within the rotation shaft coupling portion, so that a shortest distance between the tangent line T at $P_3$ and a center O of the eccentric bearing 128 is smaller than a radius of the eccentric bearing 128.

Figure 13:
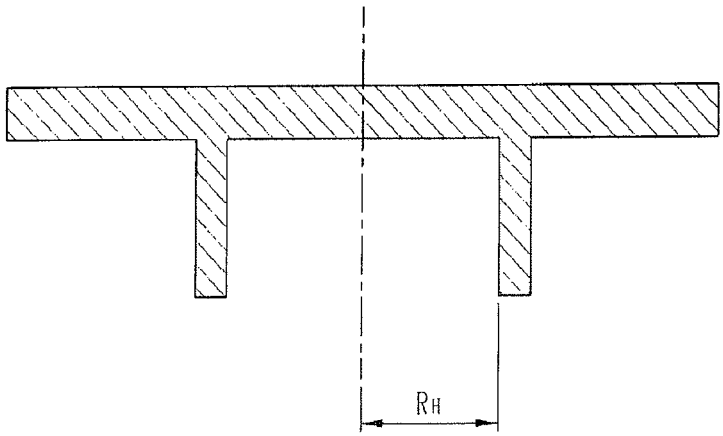
FIGS. 13(a) and 13(b) are schematic sectional views showing embodiments of a rotation shaft coupling portion of the orbiting scroll.
Figure 13:
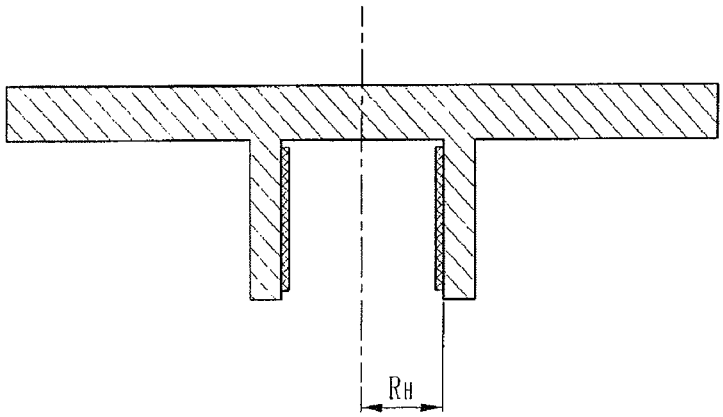

Referring to FIGS. 13(a) and 13(b), the inner radius $R_H$ may be defined as an inner radius of the rotation shaft coupling portion when an inner circumferential surface of the rotation shaft coupling portion or an outer circumferential surface of the eccentric bearing is lubricated without a separate bearing, as shown in FIG. 13(a), or may be defined as an outer radius of the bearing when a separate bearing is additionally employed within the rotation shaft coupling portion as shown in FIG. 13(b).

Figure 12:
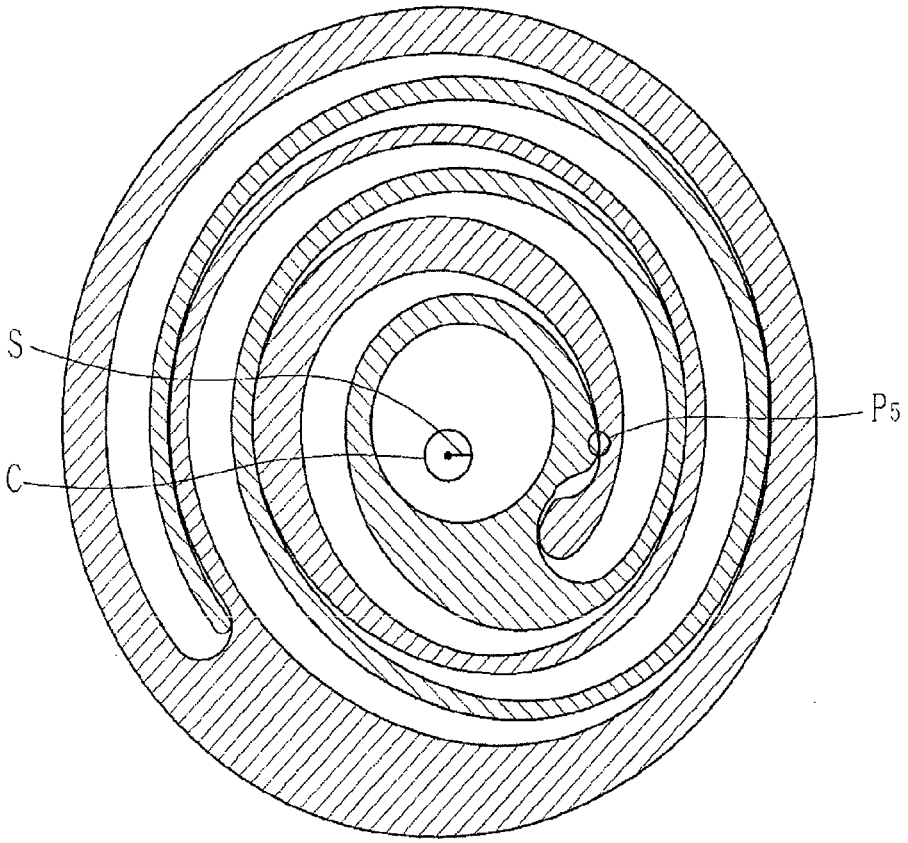
FIG. 12 is a planar view showing a state that the orbiting wrap contacts with the fixed wrap at point $P_5$.

In FIGS. 11 and 12, a point $P_5$ denotes an inner contact point when the crank angle is 270°, as shown in FIG. 12. A radius of curvature of an outer circumference of the rotation shaft coupling portion may have various values depending on each position between the points $P_3$ and $P_5$. Here, the average radius of curvature $R_m$ defined by the following equation may influence the compression ratio of the first compression chamber:

$$R_m = \frac{1}{90}\int_0^{90} R_\theta \, d\theta$$

where $R_\theta$ is a radius of curvature of the orbiting wrap at the inner contact point of the first compression chamber when the crank angle is θ.

Figure 14:
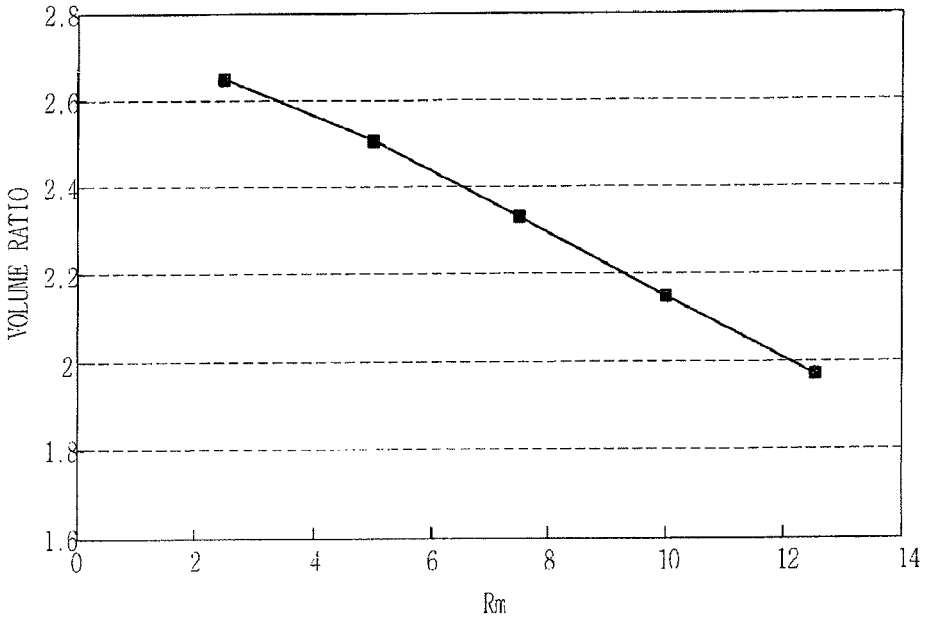
FIG. 14 is a graph showing changes of compression ratios in response to an average radius of curvature $R_m$ in the exemplary embodiment of FIG. 8.

FIG. 14 is a graph showing a relationship between an average radius of curvature and a compression chamber. In general, regarding a rotary compressor, it may have a compression ratio more than 2.3 when being used for both cooling and heating, and more than 2.1 when being used for cooling. Referring to FIG. 14, when the average radius of curvature is less than 10.5, the compression ratio may be more than 2.1. Therefore, if $R_m$ is set to be less than 10.5 mm, the compression ratio may be more than 2.1. Here, $R_m$ may be optionally set to be suitable for the use of the scroll compressor. In the exemplary embodiment, the $R_H$ may have a value of approximately 15 mm. Therefore, the $R_m$ may be set to be smaller than $R_H/1.4$.

Meanwhile, the point $P_5$ may not always be limited to when the crank angle is 270°. In view of the operating algorithm of the scroll compressor, a design variable with respect to a radius of curvature up to 270° is low. Accordingly, in order to improve a compression ratio, it is advantageous to change a shape between 270° and 360°, in which the design variable is relatively high.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds, are therefore intended to be embraced by the appended claims.

What is claimed is:

1. A scroll compressor comprising:

a fixed scroll having a fixed wrap;

an orbiting scroll having an orbiting wrap, the orbiting wrap configured to define first and second compression chambers at an outer side surface and an inner side surface thereof together with the fixed wrap, the orbiting scroll configured to perform an orbiting motion with respect to the fixed scroll;

a rotation shaft [having] *provided with* an eccentric [portion at one end portion thereof] *bearing*, the eccentric

[portion] *bearing* coupled to the orbiting [wrap] *scroll* to overlap with [each other] *the orbiting wrap* in a lateral direction; and a driving unit configured to drive the rotation shaft, wherein a shortest distance between a center O of the eccentric [portion] *bearing* and a tangent line at $P_3$ is smaller than a [diameter] *radius* of the eccentric [portion] *bearing*, where $P_3$ is a contact point between the orbiting wrap and the fixed wrap defining one end of the first compression chamber.

2. The scroll compressor of claim 1, wherein the point $P_3$ is defined as the inner contact point of the first compression chamber upon initiation of discharging of the first compression chamber.

3. The scroll compressor of claim 2, wherein a thickness of the fixed wrap is decreased and then increased as moving from $P_3$ to $P_4$, where $P_4$ is an inner contact point of the first compression chamber 150° before initiating the discharge operation of the first compression chamber.

4. The scroll compressor of claim 1, further comprising:

a rotation shaft coupling portion formed at a central portion of the orbiting scroll, the eccentric [portion] *bearing* being coupled to the rotation shaft coupling portion;

a protruding portion protruding from an inner circumferential surface of an inner end of the fixed wrap; and a recess portion recessed at an outer circumferential surface of the rotation shaft coupling portion, wherein the outer circumferential surface of the rotation shaft coupling portion at the recess portion contacts the protruding portion of the fixed wrap.

5. A scroll compressor comprising:

a fixed scroll having a fixed wrap;

an orbiting scroll having an orbiting wrap, the orbiting wrap configured to define first and second compression chambers at an outer side surface and an inner side surface thereof together with the fixed wrap, the orbiting scroll configured to perform an orbiting motion with respect to the fixed scroll;

a rotation shaft having an eccentric portion [at one end thereof], the eccentric portion coupled to the orbiting wrap to overlap with each other in a lateral direction; and a driving unit configured to drive the rotation shaft, wherein the first compression chamber is defined between two contact points $P_1$ and $P_2$ generated by the contact between an inner side surface of the fixed wrap and an outer side surface of the orbiting wrap, and wherein [$0°<\alpha<360°$] *$270°<\alpha<345°$*, where $\alpha$ is an angle defined by two lines which connect a center O of the eccentric portion to the two contact points $P_1$ and $P_2$, respectively, *and*

*wherein a distance l between normal vectors at the two contact points $P_1$ and $P_2$ is greater than 0.*

[6. The scroll compressor of claim 5, wherein a distance l between normal lines at the two contact points $P_1$ and $P_2$ is greater than 0.]

7. The scroll compressor of claim [6] *5*, wherein the normal [lines] *vectors* at the two contact points $P_1$ and $P_2$ are different from each other.

8. The scroll compressor of claim 5, wherein a rotation shaft coupling portion is formed at a central portion of the orbiting scroll, the rotation shaft coupling portion having an outer circumferential surface defining a part of the orbiting wrap, an inner side of the rotation shaft coupling portion being coupled with the eccentric portion[, wherein $0°<\alpha<360°$ and $l>0$ when the first compression chamber is located at the outer circumferential surface of the rotation shaft coupling portion].

[9. The scroll compressor of claim 5, wherein $270°<\alpha<345°$ and $l>0$.]

10. The scroll compressor of claim 5, wherein the rotation shaft comprises:

a shaft portion connected to the driving unit;

a pin portion formed at [an end of] the shaft portion to be concentric with the shaft portion; *and* an eccentric bearing eccentrically provided on the pin [portion; and ] *portion,*

*wherein* a rotation shaft coupling portion *is* formed at a central portion of the orbiting scroll, *and* wherein the eccentric bearing is rotatably coupled to the rotation shaft coupling portion.

11. The scroll compressor of claim 10, further comprising:

a protruding portion protruding from an inner circumferential surface of an inner end of the fixed wrap; and a recess portion recessed at an outer circumferential surface of the rotation shaft coupling portion, wherein the outer circumferential surface of the rotation shaft coupling portion at the recess portion contacts the protruding portion of the fixed wrap.

12. A scroll compressor comprising:

a fixed scroll having a fixed wrap;

an orbiting scroll having an orbiting wrap, the orbiting wrap configured to define first and second compression chambers at an outer side surface and an inner side surface thereof together with the fixed wrap, the orbiting scroll configured to perform an orbiting motion with respect to the fixed scroll;

a rotation shaft having an eccentric portion [at one end thereof], the eccentric portion coupled to the orbiting wrap to overlap with each other in a lateral direction; and a driving unit configured to drive the rotation shaft, wherein a thickness of the fixed wrap is decreased and then increased moving in a direction from $P_3$ to $P_4$, where $P_3$ is an inner contact point of the first compression chamber upon initiating a discharge operation of the first compression chamber, and $P_4$ is an inner contact point of the first compression chamber 150° before initiating the discharge operation of the first compression chamber.

13. The scroll compressor of claim 12, wherein the fixed wrap is thickest at a location between $P_3$ and an inner end of the fixed wrap.

14. The scroll compressor of claim 12, wherein a distance $D_O$ is increased and then decreased as moving from $P_3$ to $P_4$, where $D_O$ is a distance between a center of the eccentric portion and an outer circumferential surface of the orbiting wrap.

15. A scroll compressor comprising:

a fixed scroll having a fixed wrap;

an orbiting scroll having an orbiting wrap, the orbiting wrap configured to define first and second compression chambers at an outer side surface and an inner side surface thereof together with the fixed wrap, the orbiting scroll configured to perform an orbiting motion with respect to the fixed scroll;

a rotation shaft [having an eccentric portion at one end thereof,] *provided with an eccentric bearing,* the eccentric [portion] *bearing* coupled to the orbiting [wrap] *scroll* to overlap with [each other] *the orbiting wrap* in a lateral direction;

a driving unit configured to drive the rotation shaft;

a rotation shaft coupling portion formed at a central portion of the orbiting scroll, the eccentric [portion] *bearing* being coupled to the rotation shaft coupling portion;

a protruding portion protruding from an inner circumferential surface of an inner end of the fixed wrap; and a recess portion recessed at an outer circumferential surface of the rotation shaft coupling portion, wherein the outer circumferential surface of the rotation shaft coupling portion at the recess portion contacts the protruding portion of the fixed wrap.

16. The scroll compressor of claim 15, wherein a *shortest* distance between a center of the eccentric [portion] *bearing* and a tangent line at a contact point between the protruding portion and the orbiting wrap at an end of the first compression chamber is smaller than a [diameter] *radius* of the eccentric [portion] *bearing*.

17. The scroll compressor of claim 15, wherein the recess portion comprises:

a first increase part defining one side wall of the recess portion; and a second increase part extending from the first increase part, wherein a thickness increase rate of the rotation shaft coupling portion at the first increase part is higher than that at the second increase part.

18. The scroll compressor of claim 17, wherein the thickness of the rotation shaft coupling portion is decreased after the second increase part.

19. The scroll compressor of claim 17, wherein another side wall of the recess portion is arcuate.

20. The scroll compressor of claim 15, wherein the protruding portion comprises:

a first part defining one side wall of the protruding portion; and a second part extending from the first part, wherein a thickness decrease rate at the first part is higher than that at the second part.

* * * * *